Aug. 17 1943.    C. D. MORTON    2,326,963
TREAD PLATE
Filed Aug. 2, 1941
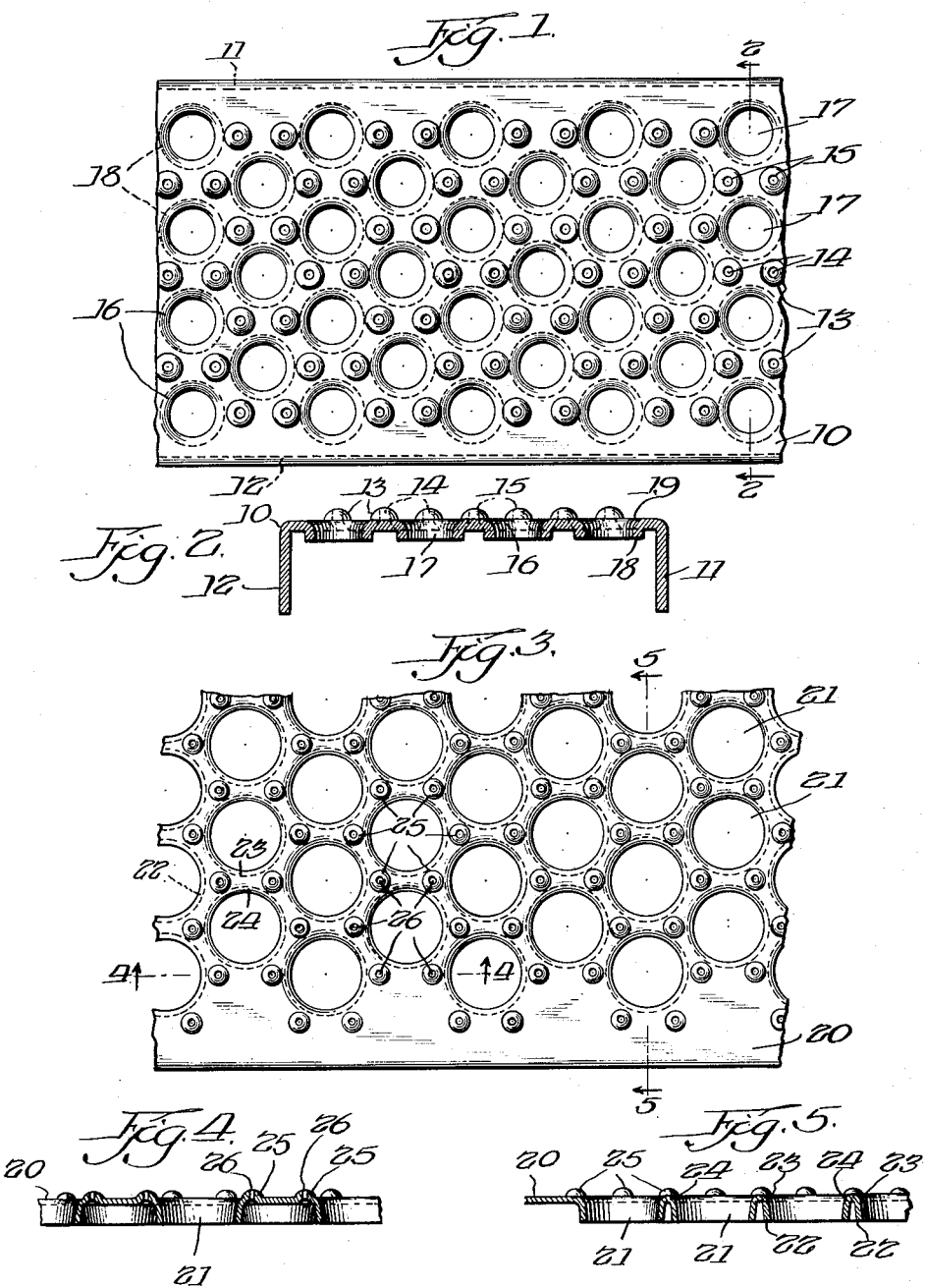
Inventor:
Charles D. Morton Patented Aug. 17, 1943

2,326,963

UNITED STATES PATENT OFFICE 2,326,963

TREAD PLATE

Charles D. Morton, Chicago, Ill., assignor to Morton Manufacturing Company, Chicago, Ill., a corporation of Illinois Application August 2, 1941, Serial No. 405,153

2 Claims. (Cl. 94—5)

My invention relates to a metal tread plate and is a continuation-in-part of Patent No. 2,278,554 granted April 7, 1942, and relates to a tread plate of the non-slipping, self-cleaning and draining type whereby dirt, snow, ice and the like are broken up and pass through openings in the plate, and water drains therefrom, leaving a plate which is safe and upon which one's foot will not slip.

Another and further object of my invention is the provision of a metal tread plate especially adapted for use on runways for railway box cars, doors in sidewalks, and the like, where it is desirable to admit air to a space in the sidewalk and yet provide means for snow, dirt and the like to be forced through the tread and drop below the tread. In the case of a runway for a car the foreign matter passes through openings in the tread, so that sufficient surface is provided to grip the soles of the shoes of the wearer as he passes over the tread. A tread is thus provided which is substantially self-cleaning and yet affords sufficient friction on the surface thereof so that one walking over the surface is not apt to slip and fall.

Another and further object of my invention is the provision of a tread in which the arrangement of openings therethrough is such that enough space is provided for the passage of a normal quantity of snow, ice or the like, which collects on the plate, and yet maintains a substantially level tread surface at all times with means thereon to prevent slippage and without the possibility of any portion of the shoes being caught or wedged into the surface of the tread, thereby causing the wearer to lose his balance or fall.

Another and further object is the provision of a metal tread having rows of dome-shaped bosses thereon, preferably placed in longitudinal rows, with central perforations through the bosses so that gripping edges are formed around the edges of these openings. Rows of openings of much larger size than those in the bosses are placed in the plate extending preferably both horizontally and laterally. The spacing and arrangement of the large openings is sufficient to enable the plate to be substantially self-cleaning and self-draining, and yet provide a sufficient number of bosses spaced around each one of the larger openings to provide an adequate gripping surface for the tread to prevent danger of slippage.

Another and further object of my invention is the provision of a tread plate in which there are no flat surfaces over the tread portion of the plate, so that water will easily drain therefrom and not collect and become frozen making the plate slippery and affording a dangerous footing, but instead water will drain from the surface of the plate, and other foreign material will not easily lodge thereon or become packed to afford a dangerous footing.

These and other objects of my invention will be more fully and better understood by reference to the accompanying sheet of drawings, and in which—

Figure 1 is a plan view of a section of a plate embodying my invention;

Figure 2 is a sectional view on line 2—2 of Figure 1;

Figure 3 is a plan view of a section of a modified form of plate;

Figure 4 is a sectional view on line 4—4 of Figure 3; and

Figure 5 is a sectional view on line 5—5 of Figure 3.

Referring now particularly to Figure 1, a metal tread 10 is shown, composed of metal rolled or extruded as the case may be, with integrally formed depending downwardly extending flanges 11 and 12 which support the tread portion 10 in spaced relation from the base upon which it is mounted, and which allows for accumulation of snow, ice or the like, under the plate while it is in use. On the upper surface of the plate is a plurality of bosses 13, 13, these bosses being struck upward from the under side of the plate. Perforations 14, 14 are formed on the bosses 13, the upper surface of the bosses 13, 13 being dome-shaped, while the perforations 14 extend vertically thereof so that sharp edges, such as 15, 15, are formed at the intersection of the perforations 14 and the upper surface of the bosses 13, 13. The perforations 14, 14 are outwardly flared as at 16 on the under side of the plate 10.

It is old in the art to provide tread surfaces having these bosses covering the entire surface, and I have provided a plate having openings 17, 17 extending through the plate, these openings being comparatively large in size as compared with the openings through the bosses. In the form illustrated in Figures 1 and 2, flanges 18, 18 are formed on the under side of the openings which in effect form strengthening members and enable the plate to be made of lighter gauge material than might otherwise be used. The openings 17 have inwardly curved edges 19 at the upper sides thereof so that in walking over the surface of the plate the snow, ice and the like, are forced downwardly through these openings and underneath the plate. In the case of a runway as used upon a freight car or the like, the flanges 11 and 12 may have openings therein so that ultimately the snow, ice or dirt passes downwardly from the roof of the car, leaving the tread surface free of such obstruction and allowing the brakeman or trainman to walk without danger of slipping or falling. The openings 17, 17 are arranged in spaced rows extending in a horizontal direction and also in a transverse direction, with any opening being in staggered relation with respect to the openings in adjacent rows in either direction. By this arrangement a very large portion, approximately half, of the surface of the tread is open for the passage of obstructing material while maintaining a tread sufficiently strong to withstand the weight of a person walking thereon and supplying a sufficient amount of tread surface to engage the soles of the shoes of the wearer to avoid slippage.

In Figures 3, 4, and 5 a tread plate 20 is illustrated somewhat similar in general appearance to, but different in many particulars both as to design and function from, the plate illustrated in Figures 1 and 2. Openings 21, 21, larger in size than the openings 17, 17, are provided, with circular flanges 22, 22 being provided on the under side of the plate for the purpose of adding strength to the plate and enabling the plate to be made of lighter gauge material than if these flanges were not used. Entrance walls 23, 23 around the openings 21, 21 are curved to allow the ready passage of snow, ice, dirt and the like through the openings 21, 21, and provide curved surfaces 24, 24 on the top of the plate between the openings 21, 21 for drainage purposes, and also to prevent dirt, snow and ice from lodging upon and remaining on the surface of the plate 20.

Bosses 25, 25 extend upwardly from the upper surface of the plate 20 around each of the openings 21, 21, these bosses having curved upper contours with openings 26, 26 therein, with sharp edges formed around the openings 26, 26 as non-slipping means for the plate 20. In this form of plate I am able to secure a practical self-cleaning and self-draining plate not heretofore possible with tread plates of former design.

It will be understood that in the formation of the plate through the relationship of the openings therein and the arrangement of the bosses, a non-slipping surface is provided for the plate and at the same time the openings will allow foreign material to pass therethrough, since as shown in the drawing said openings comprise approximately half of the plate area. Under normal circumstances the surface of the plate will be sufficiently free of foreign material so that danger of slipping thereon is avoided. The method used in forming the bosses and the holes through the plate is well known in the art and it is not believed a detailed description is necessary in this connection.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of the appended claims.

What is claimed is:

1. A safety tread comprising a substantially flat metallic plate having large circular openings therein whereby approximately half of the plate area is formed by said openings, said openings being arranged in staggered relation in rows extending longitudinally and transversely of the plate, the metal wall surrounding each opening being bent downwardly to form a circular flange extending normal to the tread surface of the plate, said flanges forming a series of webs between openings each having the shape of an inverted U in cross section, bosses located in spaced relation around each opening and projecting upwardly from said plate, said bosses being relatively small in size compared to the diameter of said openings, and said bosses being centrally perforated whereby gripping edges are formed on the upper surfaces of said bosses.

2. A safety tread comprising a substantially flat metallic plate having large circular openings therein whereby approximately half of the plate area is formed by said openings, said openings extending in rows longitudinally and transversely of the plate with the openings in each row in each direction being staggered with respect to the openings in adjacent rows, the metal wall surrounding each opening being bent downwardly to form a circular flange extending normal to the tread surface of the plate, said flanges forming a series of webs between openings each having top curved surfaces and simulating an inverted U in cross section, whereby the top surface of the plate substantially comprises the top curved surfaces of said webs, dome-shaped bosses projecting upwardly from said webs and located in spaced relation around each opening, said bosses being relatively small in size compared to the diameter of said openings, and said bosses being centrally perforated whereby gripping edges are formed on the upper surfaces of said bosses.

CHARLES D. MORTON.